US011932034B2

(12) United States Patent
Ohashi et al.

(10) Patent No.: US 11,932,034 B2
(45) Date of Patent: Mar. 19, 2024

(54) HANDHELD PRINTING APPARATUS

(71) Applicant: CANON KABUSHIKI KAISHA, Tokyo (JP)

(72) Inventors: Tetsuyo Ohashi, Kanagawa (JP); Hiroshi Nakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/863,496

(22) Filed: Jul. 13, 2022

(65) Prior Publication Data

US 2023/0036021 A1 Feb. 2, 2023

(30) Foreign Application Priority Data

Jul. 30, 2021 (JP) ................................ 2021-125314

(51) Int. Cl.
*B41J 3/36* (2006.01)

(52) U.S. Cl.
CPC ..................................... *B41J 3/36* (2013.01)

(58) Field of Classification Search
CPC ....................................................... B41J 3/36
See application file for complete search history.

(56) References Cited

U.S. PATENT DOCUMENTS

| | | | |
|---|---|---|---|
| 5,512,926 | A | 4/1996 | Uchikata et al. |
| 5,534,899 | A | 7/1996 | Uchikata et al. |
| 5,917,518 | A | 6/1999 | Ohashi et al. |
| 6,003,985 | A | 12/1999 | Bekki |
| 6,012,810 | A | 1/2000 | Ohashi |
| 6,022,091 | A | 2/2000 | Uchikata et al. |
| 6,050,673 | A | 4/2000 | Wada et al. |
| 6,070,975 | A | 6/2000 | Uchikata et al. |
| 6,129,461 | A | 10/2000 | Nakai |
| 6,341,844 | B1 | 1/2002 | Uchikata et al. |
| 6,523,933 | B1 | 2/2003 | Hirano et al. |
| 6,796,648 | B2 | 9/2004 | Ohashi |
| 6,890,072 | B2 | 5/2005 | Ohashi |
| 6,912,063 | B1 | 6/2005 | Yamamoto et al. |
| 7,114,867 | B2 | 10/2006 | Ohashi et al. |
| 7,187,901 | B2 | 3/2007 | Ohashi |
| 8,146,529 | B2 | 4/2012 | Hakamata et al. |
| 8,220,411 | B2 | 7/2012 | Yoshino et al. |
| 8,789,491 | B2 | 7/2014 | Nagahara et al. |
| 9,259,937 | B2 | 2/2016 | Taniguchi et al. |
| 9,272,543 | B2 | 3/2016 | Ohyama et al. |
| 10,406,838 | B2 | 9/2019 | Ohashi et al. |
| 10,723,153 | B2 | 7/2020 | Ohashi et al. |
| 10,894,416 | B2 | 1/2021 | Nakai et al. |

(Continued)

FOREIGN PATENT DOCUMENTS

| | | | |
|---|---|---|---|
| JP | H1035032 A | * | 7/1996 |
| JP | 2020-040276 A | | 3/2020 |

OTHER PUBLICATIONS

Kishi, Machine TranslationofJP-H1035032-A, 1996 (Year: 1996).*

*Primary Examiner* — Scott A Richmond
(74) *Attorney, Agent, or Firm* — Venable LLP

(57) ABSTRACT

Provided is a manually scanned printing apparatus capable of suppressing deterioration in image quality. To provide this, a support portion of a guide roller and a support portion of a downstream position detection sensor are configured to be displaceable relative to each other in a direction substantially orthogonal to the printing surface of a print medium to be printed.

11 Claims, 10 Drawing Sheets

(56) References Cited

U.S. PATENT DOCUMENTS

| | | | | |
|---|---|---|---|---|
| 10,974,527 | B2 | 4/2021 | Ohashi et al. | |
| 2019/0283453 | A1* | 9/2019 | Nishii | B41J 29/023 |
| 2020/0316967 | A1 | 10/2020 | Ohashi et al. | |

* cited by examiner

PRINTING

LINE BREAK STARTS

LINE BREAK ENDS

PRINTING

HANDHELD PRINTING APPARATUS

BACKGROUND OF THE INVENTION

Field of the Invention

The present invention relates to a manually scanned handheld printing apparatus for performing printing by having an operator manually scan its body.

Description of the Related Art

Japanese Patent Laid-Open No. 2020-40276 discloses a portable image forming apparatus which (a) includes, on its body housing, rollers that guide movement in a scanning direction and a position detection sensor and (b) is configured such that the relation in height between the rollers and the position detection sensor is always constant. With such a configuration, the body housing's dimension and the roller's dimension determine the distance between print paper and the position detection sensor.

In the case where there is a void between the protrusion and the print paper as with Japanese Patent Laid-Open No. 2020-40276, it is necessary to accept a lift of the print medium with the size of the void. Accordingly, the distance between the position detection sensor and the print medium may vary as large as the size of the void. If the distance between the position detection sensor and the print medium varies during printing, it may deteriorate the image quality.

SUMMARY OF THE INVENTION

In view of the above, the present invention provides a handheld printing apparatus capable of suppressing deterioration in image quality.

A printing apparatus of the present invention is a printing apparatus comprising a holding unit configured to be held by a user to move the printing apparatus, a printing unit configured to perform printing operation for printing an image onto a print medium according to a movement of the printing apparatus, a guide unit that guides the movement of the printing apparatus, a detection unit that detects a relative moving amount between the printing apparatus and the print medium, a detection unit support portion supporting the detection unit, and a guide unit support portion supporting the guide unit which is configured to be able to displace relative to the detection unit in a direction substantially orthogonal to a printing surface of the print medium to be printed during printing.

According to the present invention, it is possible to provide a handheld printing apparatus capable of suppressing deterioration in image quality.

Further features of the present invention will become apparent from the following description of exemplary embodiments with reference to the attached drawings.

DESCRIPTION OF THE EMBODIMENTS

First Embodiment

A first embodiment of the present invention will be described below with reference to the drawings.

Note that the term "print" herein is not limited to formation of information with a meaning such as characters or a figure, and includes formation of information with a meaning and also information without a meaning. Moreover, the term is not limited by whether what is to be "printed" is elicited so as to be visually perceptible to humans, and represents a wide range of meanings such as formation of an image, a design, a pattern, or the like on a print medium and processing a print medium.

Also, the term "ink" (also referred to as "liquid") is to be widely interpreted as with the definitions of "print" mentioned above. Thus, the term represents a liquid to be used to form an image, a design, a pattern, or the like or process a print medium by being applied to a print medium, or to process an ink (e.g., solidification or insolubilization of a colorant in an ink to be applied to a print medium).

"Print medium" is mainly a medium such as a paper sheet or note, but is not particularly limited to these as long as it is a medium on which printing can be performed by attaching an ink. "Print medium" may be any material as long as it accepts an ink, such as fabric, plastic film, sheet metal, glass, ceramic, wood, or leather.

Figure 1A:
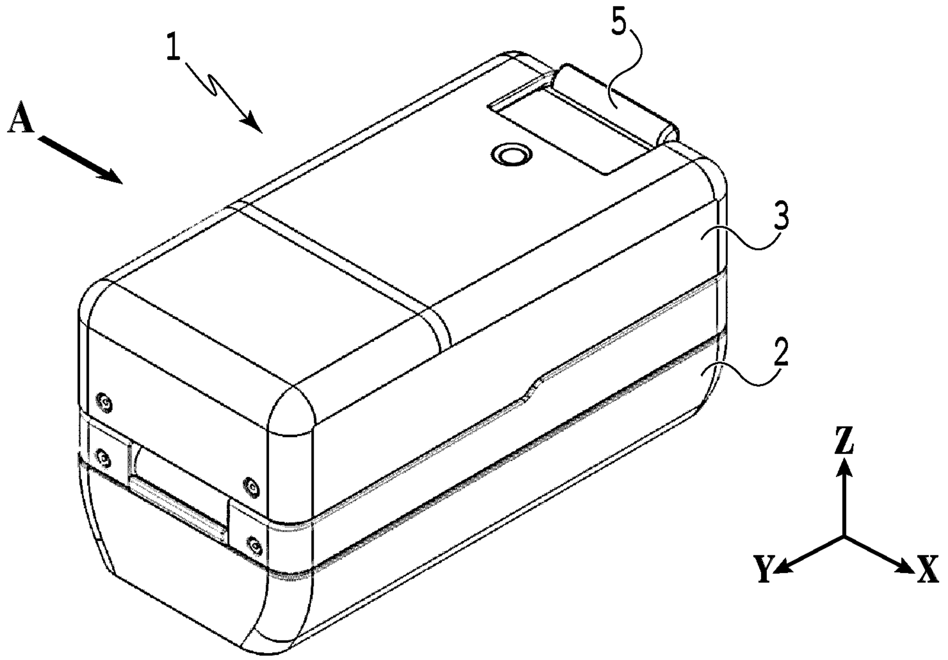
FIG. 1A is a perspective view illustrating a manually scanned handheld printing apparatus.
Figure 1B:
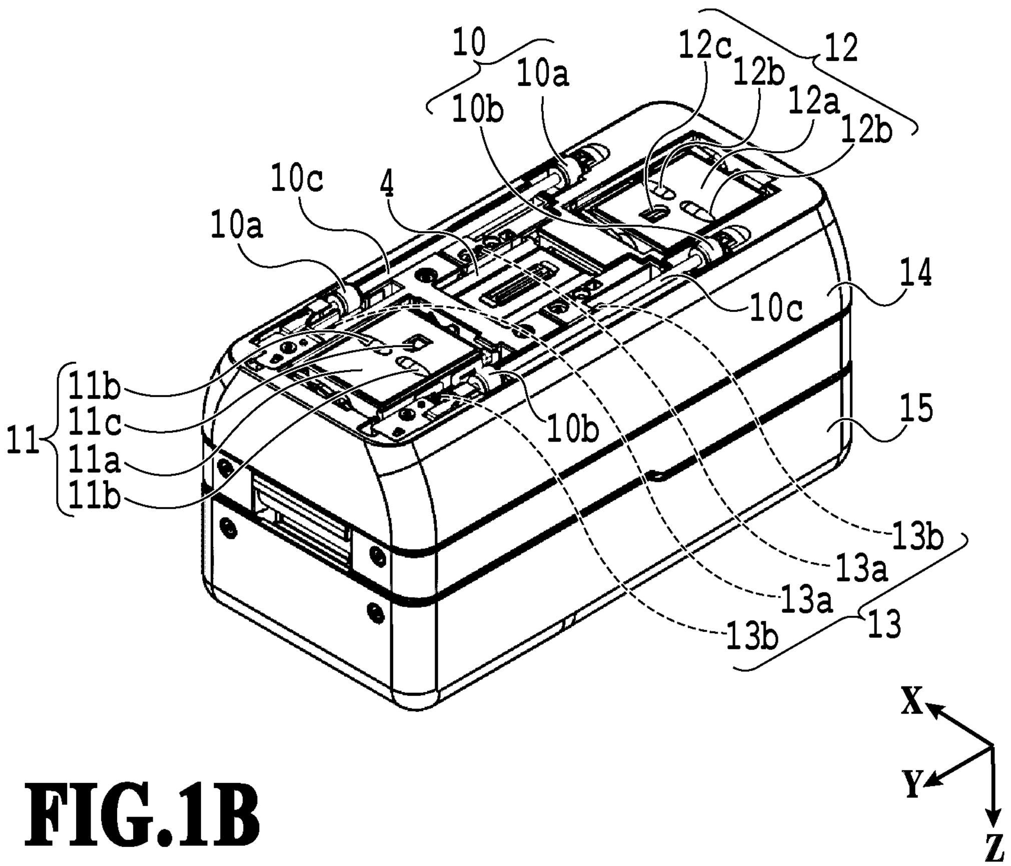
FIG. 1B is a perspective view illustrating the manually scanned handheld printing apparatus.

FIGS. 1A and 1B are perspective views illustrating a manually scanned handheld printing apparatus (hereinafter also referred to simply as "printing apparatus") 1 in the present embodiment. FIG. 1A is a view illustrating the top side of the manually scanned handheld printing apparatus 1, while FIG. 1B is a view illustrating the bottom side of the manually scanned the handheld printing apparatus 1. The printing apparatus 1 includes an upper unit 3 mainly containing a control unit's components, a lower unit 2 including a print head 4 and guide rollers 10, and a line break handle 5 to be operated by an operator in a case of performing a line break operation. The print head 4 performs printing by ejecting an ink onto a print medium with movement of the printing apparatus 1.

A plurality of guide rollers 10 are provided. In the present embodiment, these are a paired right guide roller 10*a* and left guide roller 10*b* which guide movement of the printing apparatus 1 in ±X directions while pressing a print medium P during a printing operation.

The lower unit 2 is provided with a downstream position detection sensor 11 and an upstream position detection sensor 12 with the print head 4 therebetween. The downstream position detection sensor 11 and the upstream position detection sensor 12 are provided to be capable of contacting the print medium. Relative to the print head 4, the downstream position detection sensor 11 is situated on a side in the traveling direction in a line break operation after printing a single line (i.e., in the moving direction for line break), and detects the relative moving amount between the printing apparatus 1 and the print medium. The upstream position detection sensor 12 is situated on the opposite side of the print head 4 in the traveling direction in a line break operation, and detects the moving amount of the printing apparatus body. In the present embodiment, as will be described later, a line break operation of the printing apparatus 1 is an operation of moving in a +Y direction. Thus, the +Y side will be referred to as the downstream side in the traveling direction for line break (new line side), while the −Y side will be referred to as the upstream side in the moving direction for line break (previous line side).

Figure 6A:
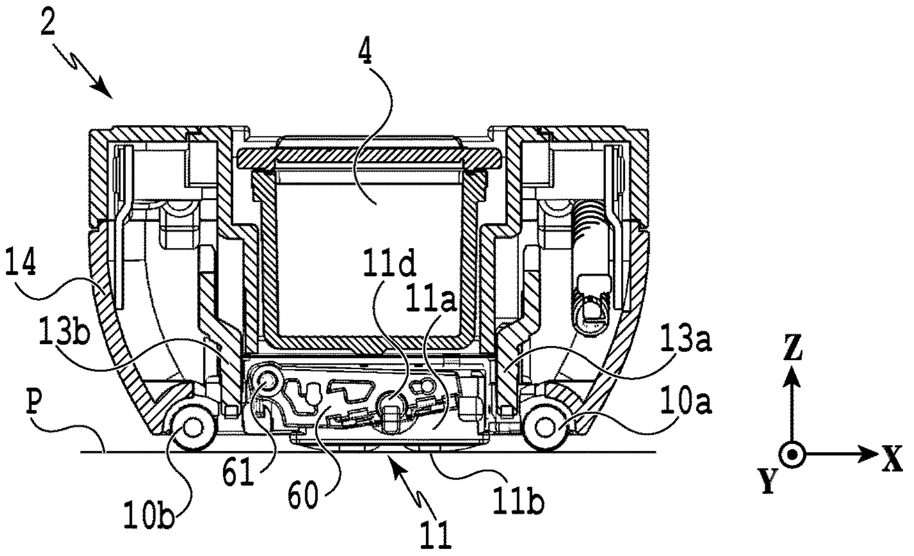
FIG. 6A is a view illustrating a downstream position detection sensor and components around it.
Figure 6B:
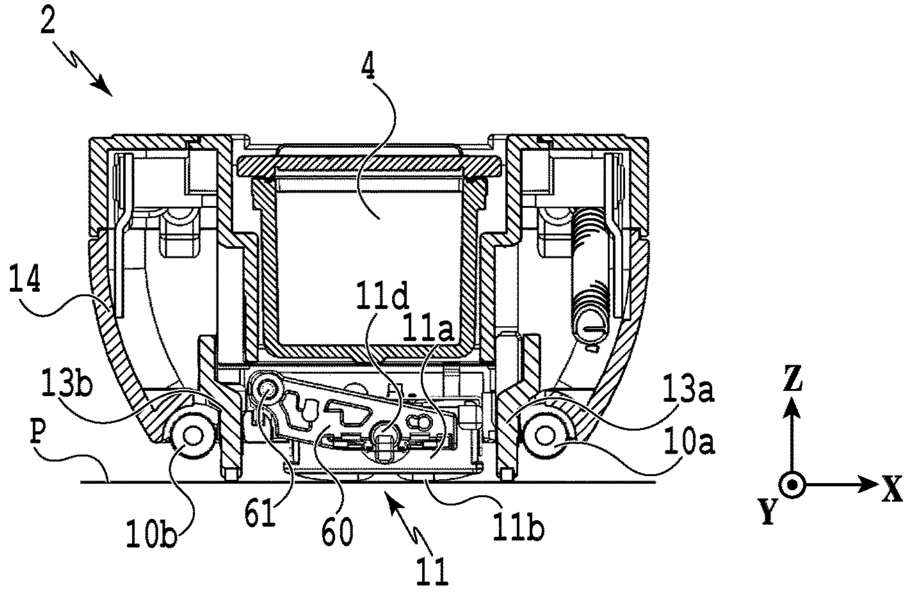
FIG. 6B is a view illustrating the downstream position detection sensor and the components around it.

The downstream position detection sensor 11 includes a sensor case 11*a*, sensor case sliders 11*b*, a sensor lens 11*c*, and a Y-direction sensor support shaft 11*d* (FIGS. 6A and 6B). The upstream position detection sensor 12 includes a sensor case 12*a*, sensor case sliders 12*b*, a sensor lens 12*c*, and a Y-direction sensor support shaft 12*d*. The lower unit 2 is further provided with line break legs 13. The line break legs 13 are members that separate the guide rollers 10 from the print medium and move the printing apparatus body during a line break operation, and include a pair of right line break legs 13*a* and a pair of left line break legs 13*b*. During a line break operation, the two right line break legs 13*a* and the two left line break legs 13*b* contact the printing surface of the print medium.

The right guide roller 10*a* and the left guide roller 10*b* are each formed as an integrated component with one shaft 10*c* and two rollers fixed to this shaft 10*c*. The two rollers are provided coaxially with each other. The shafts 10*c* of the right guide roller 10*a* and the left guide roller 10*b* are provided substantially parallel to each other, and are supported by the lower unit case 14 so as to allow the shafts 10*c* to turn while reducing their backlashes in the thrust direction. Each roller's cylindrical surface that contacts the print medium P is preferably subjected to a process such as sticking fine abrasive grains to increase the coefficient of friction with the print medium P, and the two rollers are preferably given substantially the same diameter to achieve good straightness of travel. For the straightness of travel, it is also preferable to support the right guide roller 10*a* and the left guide roller 10*b* in parallel to each other. During movement on the print medium P, configurations as above enable the guide rollers 10 to passively roll without slipping, and also improve the straightness of travel of the printing apparatus 1.

These mechanisms serve as a base of the lower unit 2 and are housed in the lower unit case 14, in which the print head 4, the guide rollers 10, and so on are disposed.

FIGS. 2A to 2D are views illustrating a printing operation of the printing apparatus 1 on the print medium Pin a step-by-step manner. In FIGS. 2A to 2D, areas PA represent printed areas where images are printed. A case of printing a first single line from the left side of the print medium P toward its right side will be described below. Note that it is also possible to perform the first printing from the right side of the print medium P toward its left side.

Figure 2A:
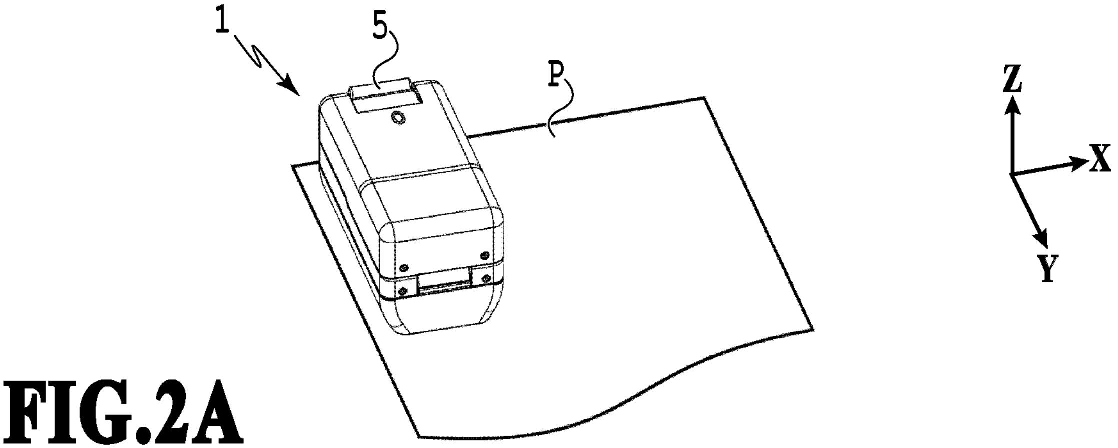
FIG. 2A is a view illustrating a printing operation of the printing apparatus on a print medium in a step-by-step manner.
Figure 2B:
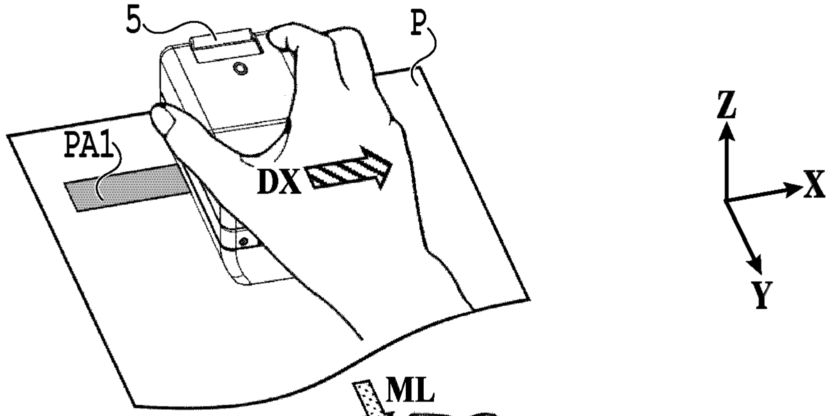
FIG. 2B is a view illustrating the printing operation of the printing apparatus on a print medium in a step-by-step manner.

When starting the printing, the printing apparatus is positioned at an upper left portion of the print medium P, as illustrated in FIG. 2A. In this state, of the components of the printing apparatus 1, the four rollers 10*a* and 10*b* of the guide rollers 10 and the sensor case sliders 11*b*, which are part of the downstream position detection sensor 11, are in contact with the print medium P, whereas the upstream position detection sensor 12 is not in contact with the print medium P. The upstream position detection sensor 12 is not in contact with the print medium P during the printing operation in order to avoid rubbing the printed area after the later-described line break operation is performed. Thereafter, in FIG. 2B, the operator places a hand on the printing apparatus 1 and moves the printing apparatus 1 in the moving direction for printing (the direction of the arrow DX). When the printing apparatus 1 starts moving, the downstream position detection sensor 11 detects the moving amount.

In the present embodiment, while the printing apparatus 1 is moved in the moving direction for printing by the operator's operation, the downstream position detection sensor 11 is used to detect the moving amount. Also, while the printing apparatus 1 is moved in a line break direction by a line break operation by the later-described line break mechanism, the downstream position detection sensor 11 and the upstream position detection sensor 12 are used to detect the moving amount. An example of the detection of the moving amount by the two detection sensors is described below. The downstream position detection sensor 11 and the upstream position detection sensor 12 optically read characteristics of the surface of the print medium P, detect the moving amount from the movement start position, and integrate this moving amount to thereby calculate the current position of the printing apparatus 1.

In the present embodiment, sensors of types capable of accurately detecting moving amount are used, and the working distance between the sensors and the print medium P needs to be 2.4 mm with the distance tolerance range kept within ±0.3 mm. A printing operation is performed by detecting the relative moving amount between the printing apparatus 1 and the print medium P with sensors as above and ejecting the ink from the print head 4 according to the moving amount of the printing apparatus 1. Note that the detection method of the downstream position detection sensor 11 and the upstream position detection sensor 12 is not limited to the above method, and may be any method as long as it can detect the relative positions of the printing apparatus 1 and the print medium P.

Figure 3:
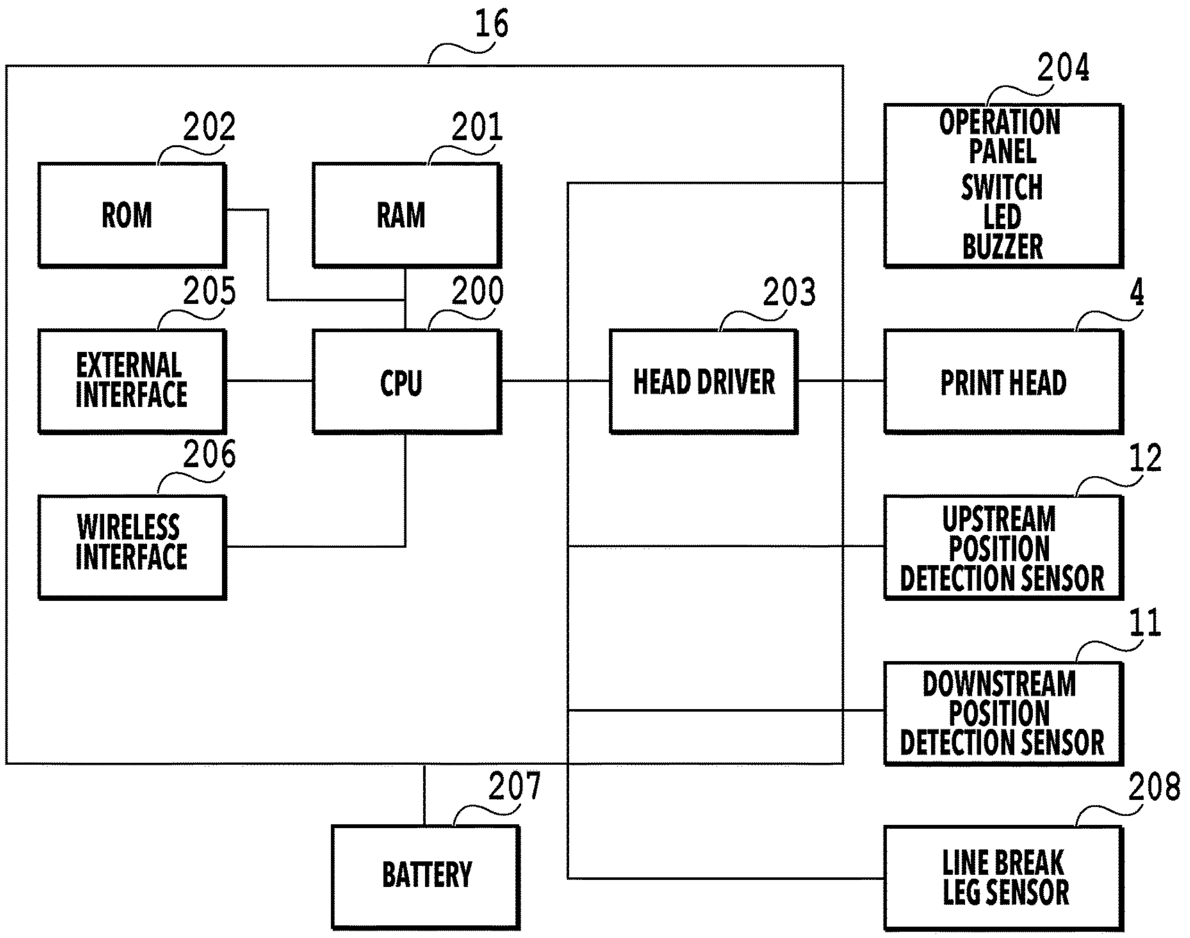
FIG. 3 is a block diagram illustrating a configuration of a control unit in the printing apparatus.

Now, a configuration of a control unit 16 in the printing apparatus 1 will be described. FIG. 3 is a block diagram illustrating a configuration of the control unit 16 in the printing apparatus 1. The control unit 16 includes a CPU 200, a RAM 201, a ROM 202, a head driver 203, an external interface 205, and a wireless interface 206. Moreover, the control unit 16 is connected to an operation panel 204, the print head 4, the upstream position detection sensor 12, the downstream position detection sensor 11, a battery 207, and a line break leg sensor 208. The CPU 200 is responsible for performing data processing, obtaining sensor information, and controlling the driving of the print head. The RAM 201 is responsible for temporarily storing programs and image data to be printed and the like. The ROM 202 stores programs and various setting values. The head driver 203 is responsible for control for ejecting the ink from the nozzles in the print head 4.

The operation panel 204 is provided in the printing apparatus 1 and includes various switches, a display unit such as an LED display, a buzzer, and so on. The external interface 205 is responsible for data exchange with an external control apparatus and the like. The wireless interface 206 wirelessly controls the printing apparatus 1 in place of the external interface 205. The battery 207 is used to drive the printing apparatus 1 in a cordless manner. The line break leg sensor 208 detects the operation of the line break legs 13 to be described later. The ink ejection of the print head 4 is controlled by these components of the control unit 16. Specifically, before the start of a printing operation, at least print data necessary for printing a single line is received via the wireless interface 206 or the external interface 205, and this print data is stored in the RAM 201. After various print settings are determined and the printing operation becomes ready to be started, the operator is notified via the operation panel 204 that the printing operation can be started.

The print head 4 employs an inkjet method by which it ejects the ink from a plurality of minute nozzles arranged substantially straight in a direction crossing the moving direction for printing. Thus, an image is formed by reading data out of the RAM 201 according to the result of the moving amount detection by the downstream position detection sensor 11 and causing the CPU 200 to determine the timing and the data to be printed at the corresponding position, and ejecting the ink from the print head 4 as appropriate. At this time, the printing apparatus 1 is manually scanned by the operator. The moving speed is therefore not guaranteed to be constant, and the speed is expected to vary. Control is performed such that the image will be printed as indicated by the original data on the print medium P even with such speed variation. By continuously performing this process, the operation of printing a single line is completed. After the completion of the single-line printing operation, the operator looks at the image or is notified of the completion of the single-line printing operation via the operation panel 204, and stops the scanning operation in the moving direction for printing DX.

Figure 2C:
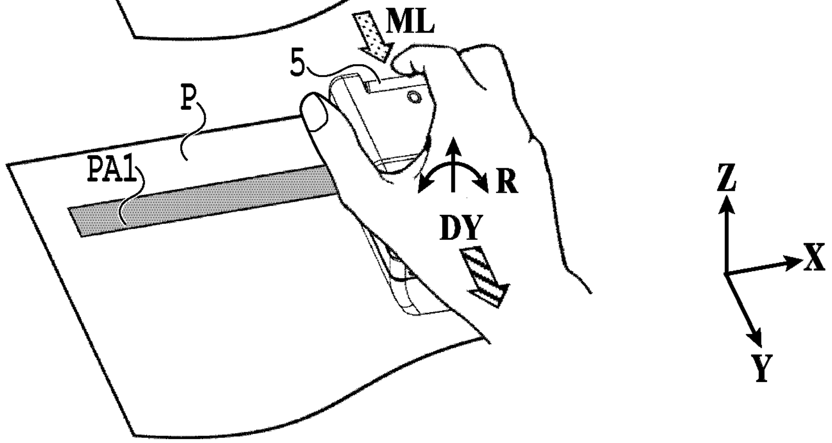
FIG. 2C is a view illustrating the printing operation of the printing apparatus on a print medium in a step-by-step manner.

In FIG. 2C, a line break operation is performed by the operator's operation. The line break operation is an operation performed for the purpose of applying an effect equivalent to a so-called line feed operation involving conveying a sheet by a predetermined distance after a single-line printing operation of the carriage in a general serial scan-type printer. Specifically, the line break operation is an operation of moving the print head 4 in the moving direction for line break (the direction of the arrow DY), which is substantially orthogonal to the moving direction for printing (the direction of the arrow DX), to a position from which to perform the next single-line printing operation according to the position, on the print medium P, of a printed area PA1 completed by the single-line printing operation.

While details of the line break operation will be described later, the operator's operation involves moving the line break handle 5 in a lever operating direction for line break (the direction of the arrow ML). In conjunction with the line break operation triggered by this operator's operation, the line break legs 13 act so as to move the printing apparatus 1 a predetermined distance in the moving direction for line break (the direction of the arrow DY). Note that the printing apparatus 1 includes a mechanism that brings not only the downstream position detection sensor 11 but also the upstream position detection sensor 12 into contact with the print medium P during a line break movement. The moving amount of the printing apparatus 1 may vary, and the printing apparatus 1 may rotate in the plane of the print medium P (in the direction of the arrow R in FIG. 2C) before or after the line break movement. In this case, by detecting the state of the line break movement of the printing apparatus 1 with the plurality of position detection sensors, it is possible to detect the amounts of the variation and the rotation. Note that the upstream position detection sensor 12 is configured to be separated from the print medium P again when the line break movement is finished. The line break operation is now completed.

Figure 2D:
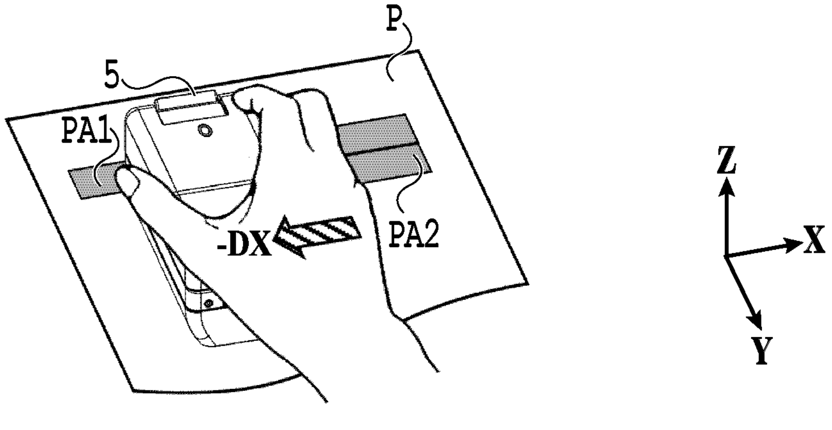
FIG. 2D is a view illustrating the printing operation of the printing apparatus on a print medium in a step-by-step manner.

Thereafter, in FIG. 2D, a printing operation is performed for the second line. The printing operation of the second line is prepared by preparing image data by a process similar to that for the printing operation of the first line and, if the moving amount varied during the line break operation, correcting the variation. The operator performs a basic operation similar to that for the first line. Here, by preparing print data during the line break operation, the printing operation will be basically ready to be performed after the line break operation. In this way, the operator can immediately start the second scan. Since the scanning direction for the second line is the reverse of the scanning direction for the first line, the operator moves the printing apparatus 1 in the direction of the arrow −DX.

The image of the second line is formed in a similar manner to the scan for the first line by detecting the moving amount with the downstream position detection sensor 11 and ejecting the ink from the print head 4 according to the position. By performing appropriate correction, images can be formed in a unified manner in the printed area PA1 of the first line and a printed area PA2 of the second line with almost no misalignment. Note that description of the method of the correction is omitted since it is not the subject matter of the present embodiment. If necessary, the operator continuously performs a printing operation in a similar manner for the third line, the fourth line, and so on to complete forming the desired image.

FIGS. 4A to 4H are views illustrating the line break mechanism in the printing apparatus 1 along the flow of a line break operation. The line break mechanism in the printing apparatus 1 includes a line break lever 50, a line break mechanism drive gear train 51, a drive gear train reset lever 52, a drive gear train reset sub lever 53, and a drive gear train reset cam 54. The line break lever 50 operates in conjunction with the line break handle 5. The line break mechanism drive gear train 51 is driven in response to the operation of the line break lever 50, and causes the line break legs 13 to operate. The line break legs 13 are rotationally moved in the clockwise direction in FIGS. 4A to 4H by the line break mechanism drive gear train 51. When the line break legs 13 come into contact with the print medium P, the line break legs 13 serve as fixed base points on the print medium P, about which the printing apparatus 1 rotationally moves in the clockwise direction in FIGS. 4A to 4H.

The drive gear train reset lever 52 brings the line break mechanism drive gear train 51 back to its initial state. The drive gear train reset sub lever 53 operates in the last half of the operation of bringing the line break mechanism drive gear train 51 back to its initial state. The drive gear train reset cam 54 receives force from the drive gear train reset lever 52 and the drive gear train reset sub lever 53. The drive gear train reset cam 54, which is on the line break mechanism drive gear train 51, is provided integrally with one of the gears of the line break mechanism drive gear train 51, and rotates in the counterclockwise direction in FIGS. 4A to 4H in response to the operation on the line break lever 50. Also, gears coupled to both sides of both sides of a gear integrally provided to the drive gear train reset cam 54 rotate in the clockwise direction in FIGS. 4A to 4H in response to the operation of the line break lever 50. The line break legs 13 make the clockwise rotational movement in synchronization with this rotation.

Figure 4A:
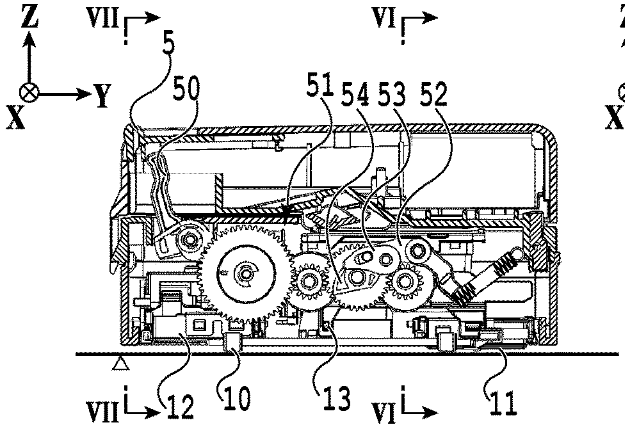
FIG. 4A is a view illustrating a line break mechanism in the printing apparatus along the flow of a line break operation.

FIG. 4A illustrates a normal standby state and a printing operation state before entering a line break operation. The line break handle 5 is stopped at its initial position in a state of being biased by a spring not illustrated. The guide rollers 10 are in contact with the print medium P and supported by bearings not illustrated which are provided in the lower unit case 14. Hence, the height to the printing apparatus 1 is determined by the guide rollers 10. The downstream position detection sensor 11 is constantly pressed in such a direction as to contact the print medium P, thereby being ready to measure the moving amount. The upstream position detection sensor 12 has retracted to a retracted position in conjunction with the line break mechanism drive gear train 51, thereby not being in contact with the print medium P. The line break legs 13 are in a standby state at their initial positions inside the printing apparatus 1, being not in contact with the print medium P.

Figure 4B:
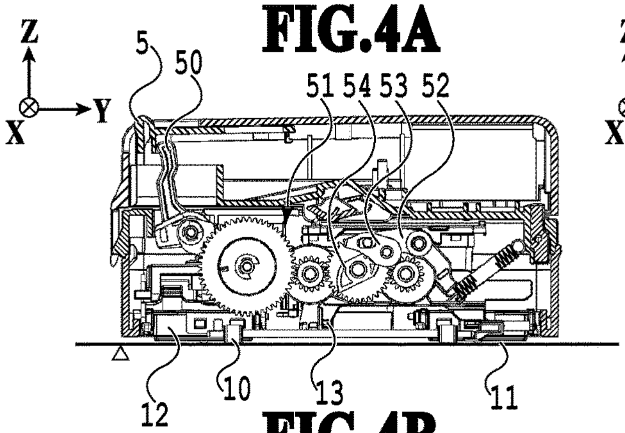
FIG. 4B is a view illustrating the line break mechanism in the printing apparatus along the flow of the line break operation.
Figure 4C:
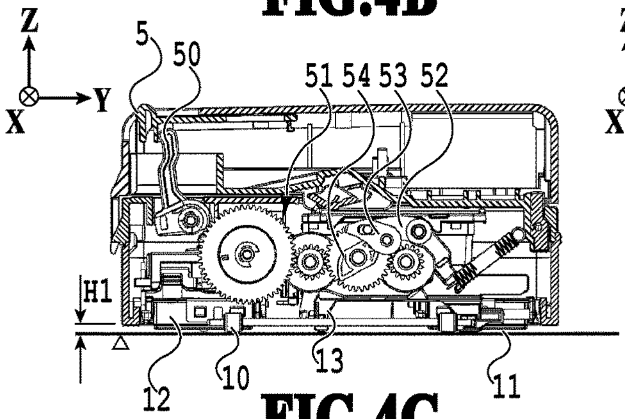
FIG. 4C is a view illustrating the line break mechanism in the printing apparatus along the flow of the line break operation.

FIG. 4B illustrates a state where the operator starts pulling the line break handle 5 in the +Y direction in FIG. 4B, thereby starting a line break operation. In response to the start of the line break operation, firstly, a lock member (arm drive lever A 63 in FIG. 7A) which has retracted the upstream position detection sensor 12 moves in a −Z direction. As a result, the upstream position detection sensor 12 becomes movable in the ±Z directions (up-down direction), and also pressed by a pressing spring not illustrated in the −Z direction into contact with the print medium P. Thereafter, in FIG. 4C, the operator moves the line break handle 5 farther in the +Y direction. This causes the line break mechanism drive gear train 51 to act so as to move the line break legs 13 in the −Z direction into contact with the print medium P.

Figure 4D:
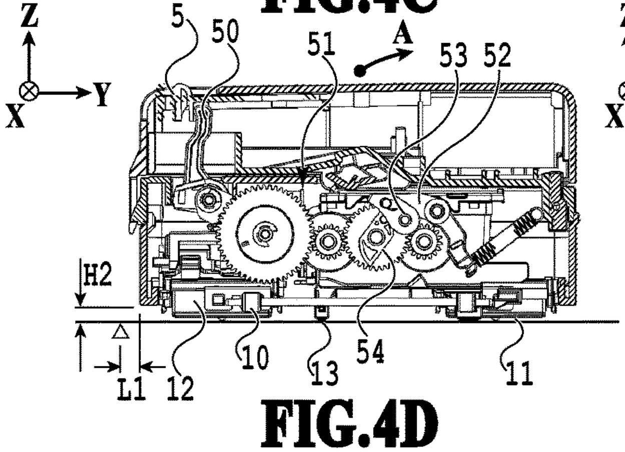
FIG. 4D is a view illustrating the line break mechanism in the printing apparatus along the flow of the line break operation.

Next, in FIG. 4D, the line break handle 5 is moved farther in the +Y direction by the operator's operation. As a result, the line break legs 13 project farther than the guide rollers 10 in the −Z direction. This causes the printing apparatus 1 to start moving in the +Z direction. The line break legs 13 themselves make a transitional movement having a rotational locus inside the printing apparatus 1 in conjunction with gears of the line break mechanism drive gear train 51. Since the tips of the line break legs 13, which are made of a slip resistance material, are in contact with the print medium P, the body of the printing apparatus 1 conversely starts moving in the +Z direction with a transitional movement having a rotational locus.

Specifically, the body of the printing apparatus 1 moves in the direction of the arrow A in FIG. 4D. FIG. 4D illustrates a state where the printing apparatus 1 has reached a half of the moving amount for the line break operation. This is a state where the printing apparatus 1 has moved a distance L1 in the moving direction for line break (+Y direction) from its position before the start of the line break (the white triangle mark in FIG. 4D). It can be observed that the height from the print medium P to the body of the printing apparatus 1 was H1 at the point of FIG. 4C but the height to the body of the printing apparatus 1 has increased to H2 in FIG. 4D. As the body of the printing apparatus 1 gets separated from the print medium P, the guide rollers 10 get separated from the print medium P as well. This enables the printing apparatus 1 to move forward in a direction other than the moving direction in the printing operation. As the line break mechanism drive gear train 51 further rotates from the state of FIG. 4D, the printing apparatus 1 starts moving in the −Z direction. During this time too, the upstream position detection sensor 12 keeps receiving a pressing force from the pressing spring. Thus, not only the downstream position detection sensor 11 but also the upstream position detection sensor 12 remains in contact with the print medium P.

Figure 4E:
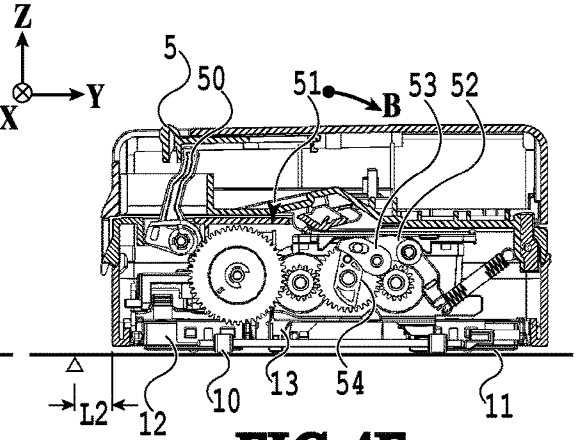
FIG. 4E is a view illustrating the line break mechanism in the printing apparatus along the flow of the line break operation.
Figure 4F:
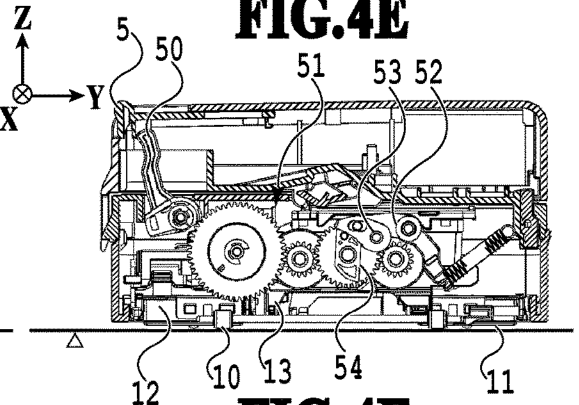
FIG. 4F is a view illustrating the line break mechanism in the printing apparatus along the flow of the line break operation.

Next, in FIG. 4E, the line break handle 5 is moved farther in the +Y direction by the operator's operation and reaches a predetermined position. As a result, the guide rollers 10 contact the print medium P, and the line break legs 13 are contained in the printing apparatus 1. With the guide rollers 10 contacting the print medium P, the guide rollers 10 act such that the printing apparatus 1 stops moving in the line break direction (+Y direction). The printing apparatus 1 has now completed moving a moving amount L2 determined in advance by the configuration of the line break mechanism drive gear train 51. Thereafter, in FIG. 4F, the line break handle 5 is returned to its initial position illustrated in FIG. 4A by the action of the spring not illustrated. Note that the above does not apply if the operator keeps holding the line break handle 5. Incidentally, the line break lever 50 and the line break mechanism drive gear train 51 are coupled via a one-way clutch not illustrated. Thus, the line break mechanism drive gear train 51 shifts to the next operation regardless of the position of the line break lever 50.

The drive gear train reset cam 54 on the line break mechanism drive gear train 51 is at such an angular phase as to receive a force from the drive gear train reset lever 52 and the drive gear train reset sub lever 53, which are spring-biased. Thus, due to the force from the drive gear train reset lever 52 and the drive gear train reset sub lever 53, the drive gear train reset cam 54 is subjected to a rotational force in the counterclockwise direction in FIGS. 4A to 4H. The line break mechanism drive gear train 51 keeps operating for as long as this rotational force acts on the drive gear train cam 54. Also, immediately after reaching the state of FIG. 4F, the lock member not illustrated in FIGS. 4A to 4H (the arm drive lever A 63 in FIG. 7A) rises, so that the upstream position detection sensor 12 starts moving in the +Z direction toward the retracted position.

Figure 4G:
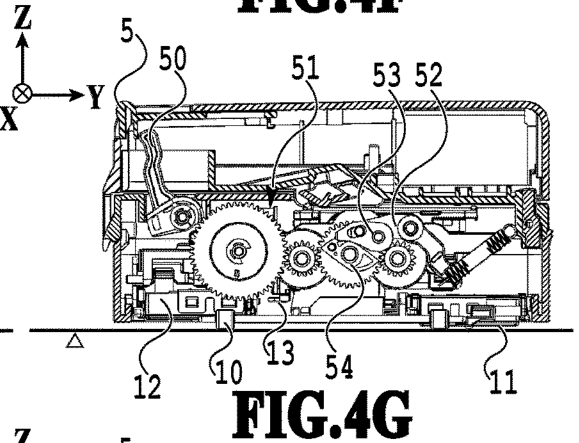
FIG. 4G is a view illustrating the line break mechanism in the printing apparatus along the flow of the line break operation.
Figure 4H:
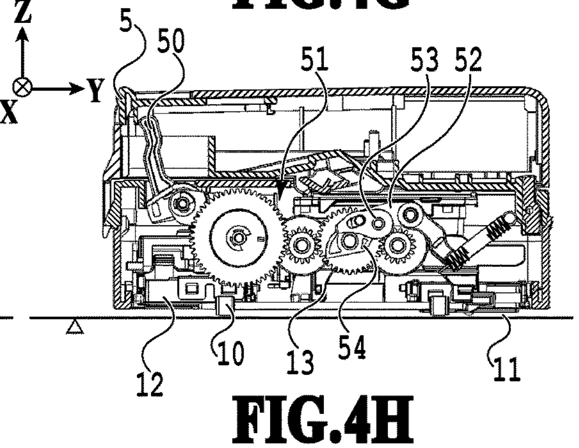
FIG. 4H is a view illustrating the line break mechanism in the printing apparatus along the flow of the line break operation.

FIG. 4G illustrates a next state where the line break legs 13 have moved to the farthest position from the print medium P in the course of the resetting operation of the line break mechanism drive gear train 51. In this state, the upstream position detection sensor 12 has moved to the retracted position and is completely separated from the print medium P. FIG. 4H illustrates a subsequent state where the force from the drive gear train reset lever 52 and the drive gear train reset sub lever 53 no longer acts on the drive gear train reset cam 54 and the line break mechanism drive gear train 51 has stopped rotating, so that components have returned to their initial positions. Specifically, the upstream position detection sensor 12 and the line break legs 13 have returned to the same states as their states in FIG. 4A.

Line break is performed by such a series of operations. It can be observed that the printing apparatus 1 is actually moved in the period from FIG. 4C to FIG. 4E, as described above. In this period, the height from the print medium P to the body of the printing apparatus 1 increases from the height H1 to the height H2 but the downstream position detection sensor 11 and the upstream position detection sensor 12 remain in contact with the print medium P. Thus, during a line break operation, the moving amount of the printing apparatus 1 is detected by the two sensors, the downstream position detection sensor 11 and the upstream position detection sensor 12.

Figures 5A, 5B, 5C, 5D:
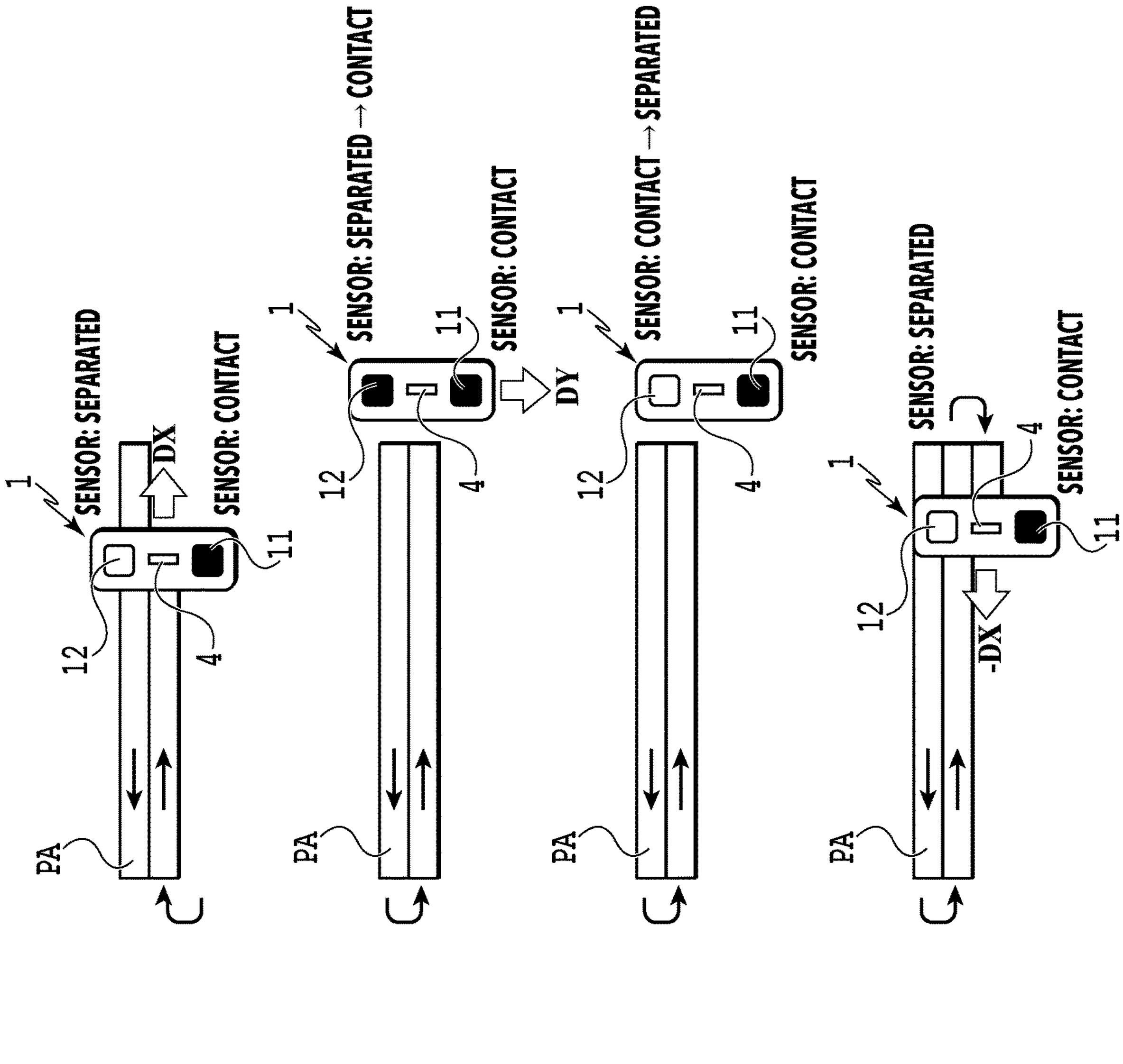
FIG. 5A is view illustrating a positional relationship between a printed area and the printing apparatus, and operating states of sensors.
FIG. 5B is view illustrating the positional relationship between the printed area and the printing apparatus, and the operating states of the sensors.
FIG. 5C is view illustrating the positional relationship between the printed area and the printing apparatus, and the operating states of the sensors.
FIG. 5D is view illustrating the positional relationship between the printed area and the printing apparatus, and the operating states of the sensors.

FIGS. 5A to 5D are views schematically illustrating the positional relationship between a printed area PA and the printing apparatus 1 and the operating state of each sensor in printing operations including line break operations. In FIGS. 5A to 5D, each black rectangle represents a state where the upstream position detection sensor 12 or the downstream position detection sensor 11 is in contact with the print medium P, while each white rectangle represents a state where the upstream position detection sensor 12 or the downstream position detection sensor 11 is not in contact with the print medium P. FIG. 5A illustrates a state where a line break operation has been performed after an operation of printing the first line from the right side of FIG. 5A to its left side, and an operation of printing the second line is being performed from the left side toward the right side. In this state, the downstream position detection sensor 11 is in contact with the print medium P while the upstream position detection sensor 12 is not in contact with the print medium P.

FIG. 5B illustrates a state where the printing operation of the second line has been finished, and a line break operation has started. Basically, the line break operation is performed from a position separated from the printed area PA. Specifically, after completing the printing of the second line, the operator continues moving the printing apparatus 1 farther and performs the line break operation from a position separated from the printed area PA. During the line break operation, the downstream position detection sensor 11 is in contact with the print medium P and the upstream position detection sensor 12 is also in contact with the print medium P. By performing the line break operation from a position separated from the printed area PA as described above, the line break operation can be performed without the upstream position detection sensor 12 rubbed on the printed area PA.

FIG. 5C illustrates a state where the line break operation has been finished. In this state, the downstream position detection sensor 11 is in contact with the print medium P while the upstream position detection sensor 12 is not in contact with the print medium P. FIG. 5D illustrates a state where an operation of printing the third line is being performed from the right side toward the left side. In this state, the downstream position detection sensor 11 is in contact with the print medium P while the upstream position detection sensor 12 is not in contact with the print medium P. Since the upstream position detection sensor 12 is not in contact with the print medium P, the upstream position detection sensor 12 is not rubbed on the printed area PA during the printing operation.

As has been described above, the upstream position detection sensor 12 switches back and forth between a contact state and a non-contact state. Hence, a trigger for determining the timing to start a position detecting operation is needed. For this reason, in the present embodiment, the line break leg sensor 208 (see FIG. 3) is used. The line break leg sensor 208 is a sensor that detects the position of the upstream position detection sensor 12, and detects whether the upstream position detection sensor 12 is in the raised position or the lowered position. The upstream position detection sensor 12 is caused to start a reading operation in a case where the line break leg sensor 208 detects that the upstream position detection sensor 12 is lowered, and is caused to finish the reading operation in a case where the line break leg sensor 208 detects that the upstream position detection sensor 12 is raised.

FIGS. 6A and 6B are views illustrating the downstream position detection sensor 11 and components around it. FIGS. 6A and 6B are views of the downstream position detection sensor 11 as seen from the position indicated by the line VI-VI of FIG. 4A. FIG. 6A illustrates a normal standby state and a printing operation state before the printing apparatus 1 enters a line break operation. The downstream position detection sensor 11 in the present embodiment is configured to be movable relative to the guide rollers 10 in the +Z direction, which is substantially orthogonal to the printing surface of the print medium. The downstream position detection sensor 11 is constantly biased toward the print medium P. In the state of FIG. 6A, the downstream position detection sensor 11 and the print medium P are in contact with each other. The guide rollers 10 are also in contact with the print medium P. FIG. 6B is a cross-sectional view illustrating the operating state illustrated in FIG. 4D, which is a state in the middle of a line break operation. In FIGS. 6A and 6B, only the lower unit 2 is illustrated, and a cross section of the upper unit 3 is omitted.

The Y-direction sensor support shaft 11*d* is formed integrally with the downstream position detection sensor case 11*a* and extends in the Y direction. A downstream sensor case support arm 60 is rotatably engaged with the Y-direction sensor support shaft 11*d* and is rotatably supported as a link that rotates about a support arm shaft 61 fixed to the lower unit case 14. In the state of FIG. 6A, the guide rollers 10 are in contact with the print medium P and at the same time the downstream position detection sensor 11 is in contact with the print medium P, as mentioned above. The downstream position detection sensor 11 is brought into contact with the print medium P as a result of the downstream sensor case support arm 60 being biased by a spring not illustrated with a moment in the clockwise direction in FIG. 6A about the support arm shaft 61.

The downstream sensor case support arm 60 presses the Y-direction sensor support shaft 11*d* in the −Z direction, and the two sensor case sliders 11*b*, which are disposed bilaterally symmetrically about the Y-direction sensor support shaft 11*d*, are brought into contact with the print medium P. As a result, the downstream position detection sensor case 11*a* is equalized along the print medium P and brought into stable contact with it. For the sensor case sliders 11*b*, it is preferable to use a material with a low coefficient of friction with the print medium P. Doing so can reduce the sliding friction between the print medium P and the sensor case sliders 11*b* during printing operations and line break operations.

Also, the bearing portion of the support arm shaft 61 and the downstream sensor case support arm 60 and the bearing portion of the downstream sensor case support arm 60 and the Y-direction sensor support shaft 11*d* are each preferably configured with as small play as possible. Configurations with small play can prevent a change in the relative positions of the lower unit case 14 and the downstream position detection sensor case 11*a* and vibration of the downstream position detection sensor case 11*a* when the sensor case sliders 11*b* receive a frictional force. Moreover, the downstream position detection sensor case 11*a* and the downstream sensor case support arm 60 have a spring installed on one side of a support portion of the downstream position detection sensor case 11*a* so as to bias the downstream position detection sensor case 11*a* in one of the ±Y directions. This configuration can prevent a change in the relative position of the downstream position detection sensor case 11*a* in the line break direction and vibration of the downstream position detection sensor case 11*a*.

Owing to such a support configuration of the downstream position detection sensor 11, the downstream position detection sensor case 11*a* is stably pressed against the print medium P. Accordingly, the distance between the sensor lens 11*c* and the downstream position detection sensor 11, which are fixed inside the downstream position detection sensor case 11*a*, and the print medium P can be maintained constant. Moreover, the distance between the downstream position detection sensor 11 and the print medium P can be accurately maintained since the accuracy of the distance is determined by the dimensional accuracy of a single component, the downstream position detection sensor case 11*a*.

The downstream position detection sensor case 11*a* is usually a part produced by resin molding with a mold. Accordingly, the part's dimensional reproducibility is high. This makes it possible to significantly reduce variation between products. Further, as illustrated in FIG. 1B, the sensor case sliders 11*b* are positioned very close to the sensor lens 11*c*. Thus, even if the print medium P is deformed, the sensor case sliders 11*b* hold down the deformed portion. Hence, the downstream position detection sensor 11 is hardly affected by the deformation of the print medium P and can stably detect the moving amount.

During a line break operation, as illustrated in FIG. 6B, the line break legs 13 project from a lower portion of the lower unit case 14 and come into contact with the print medium P, so that the body of the printing apparatus 1 moves in the +Z direction. At this time, the downstream sensor case support arm 60, which is biased in the −Z direction by the spring not illustrated, rotates clockwise and keeps biasing the downstream position detection sensor case 11*a* toward the print medium P. This makes it possible to continue detecting the moving amount of the printing apparatus 1 even during the line break operation.

As described above, in the present embodiment, the guide rollers 10, which guide movement of the printing apparatus 1 while pressing the print medium P, and the downstream position detection sensor 11 are configured to be movable relative to each other. Thus, during printing operations, regardless of the state of the print medium P pressed by the guide rollers 10, the downstream position detection sensor 11 can bias the print medium P while also maintaining the distance between the downstream position detection sensor 11 and the print medium P, thereby suppressing variation in the distance.

It suffices that the guide rollers 10 and the downstream position detection sensor 11 be configured such that the support portions of the guide rollers 10 and the downstream position detection sensor 11 (guide unit support portion, detection unit support portion) are displaceable relative to each other with the backlashes at these support portions into account.

In the present embodiment, the movement of the downstream position detection sensor 11 involves a rotational movement via a swinging movement of the downstream sensor case support arm 60. This means that the downstream position detection sensor 11 is slightly displaced in the ±X directions as viewed from the lower unit case 14. Nonetheless, the slight displacement in the ±X directions is not problematic since it is only necessary to compare the position in the Y direction in the state of FIG. 4C and that in the state of FIG. 4E in order to determine the moving distances and moving directions before and after a line break operation.

The configuration of the downstream position detection sensor 11 described above is the same as the upstream position detection sensor 12. Thus, the above statement also applies to the upstream position detection sensor 12.

Next, a reason for retracting the upstream position detection sensor 12 to separate it from the print medium P during periods other than while line break operations are performed in the present embodiment will be described. As has been described above, detecting the position of the printing apparatus 1 requires the sensor case sliders 11*b* and 12*b* (see FIG. 1B) and the print medium P to be rubbed against each other. As can be analogized from the explanatory views of FIGS. 2C and 2D, if the upstream position detection sensor 12 is brought into contact with the print medium P during the printing of the second line in FIG. 2D or of a subsequent line, the sensor case sliders 12*b* get rubbed on the printed area PA. If there is an ink yet to be fixed in the rubbed region, the sensor case sliders 12*b* spread this ink over the print medium P, which results in unintended soiling. This deteriorates the image quality and must be avoided.

For this reason, in the present embodiment, the upstream position detection sensor 12 is separated from the print medium P during printing operations. During line break operations, which are performed outside the printed area PA, rubbing the upstream position detection sensor 12 does not cause soiling. The upstream position detection sensor 12 is therefore brought into contact with the print medium P, and the position of the printing apparatus 1 is detected with the two sensors, the downstream position detection sensor 11 and the upstream position detection sensor 12. This enables accurate measurement of the moving amount of the printing apparatus 1.

Figure 7A:
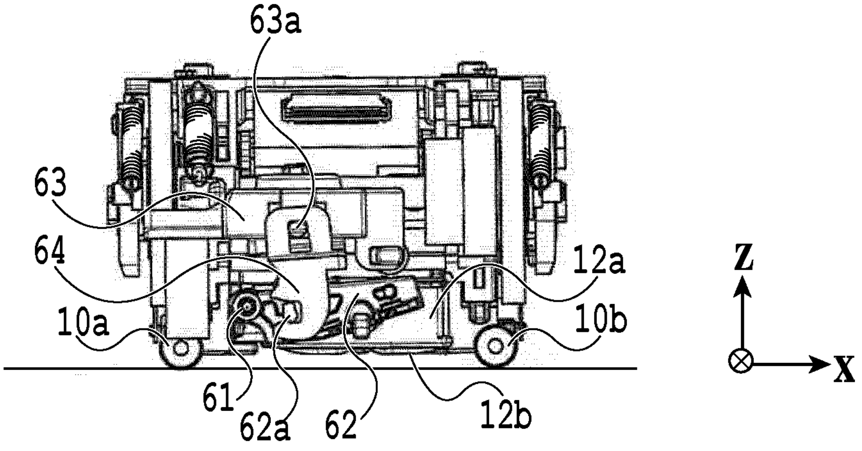
FIG. 7A is a view illustrating an upstream position detection sensor and components around it.
Figure 7B:
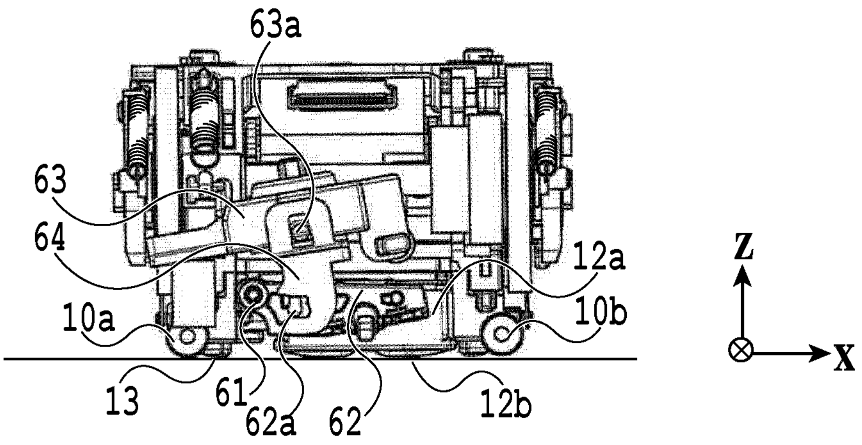
FIG. 7B is a view illustrating the upstream position detection sensor and the components around it.
Figure 7C:
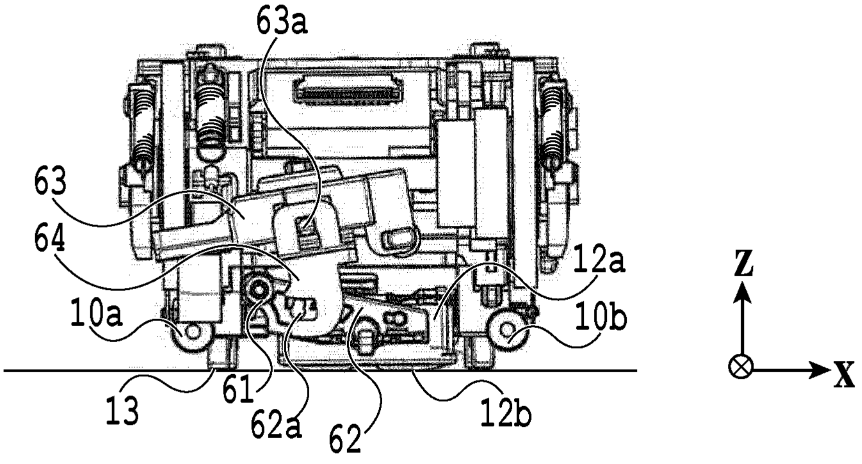
FIG. 7C is a view illustrating the upstream position detection sensor and the components around it.

FIGS. 7A to 7C are views illustrating the upstream position detection sensor 12 and components around it. FIGS. 7A to 7C are views of the upstream position detection sensor 12 as seen from the position indicated by the line VII-VII of FIG. 4A. FIG. 7A illustrates a normal standby state and a printing operation state before the printing apparatus 1 enters a line break operation. The upstream position detection sensor 12 in the present embodiment is configured to be movable relative to the guide rollers 10 in the ±Z directions, like the downstream position detection sensor 11.

The upstream position detection sensor 12 is configured to be capable of being moved by a moving mechanism between the retracted position and the contact position in conjunction with the line break mechanism drive gear train 51. The moving mechanism includes an upstream sensor case support arm 62, the arm drive lever A 63, and an arm drive lever B 64. Like the downstream sensor case support arm 60 (see FIGS. 6A and 6B), the upstream sensor case support arm 62 supports the upstream position detection sensor case 12*a*. The arm drive lever A 63 is used to drive the upstream sensor case support arm 62. The arm drive lever B 64 is a member linking the arm drive lever A 63 and the upstream sensor case support arm 62.

In the state of FIG. 7A, the upstream position detection sensor 12 has retracted to the retracted position in conjunction with the line break mechanism drive gear train 51 and is not in contact with the print medium P. The upstream position detection sensor 12 is basically configured to be moved in the ±Z directions by the moving mechanism in conjunction with the line break mechanism drive gear train 51. The upstream position detection sensor 12 is brought into contact with the print medium P only during line break operations. During other periods, the upstream position detection sensor 12 is separated from the print medium P and retracted to the retracted position inside the body of the printing apparatus 1.

During printing operations, during which the upstream position detection sensor 12 is located at the retracted position, and in a state immediately before starting a line break operation (the state of FIG. 7A), a spring not illustrated acts on the arm drive lever A 63 such that the arm drive lever A 63 is biased in the +Z direction and brought into contact with and stopped by a stopper not illustrated. The arm drive lever A 63 includes a protrusion 63*a*. The arm drive lever A 63 is engaged with the upstream sensor case support arm 62 via the arm drive lever B 64 fitted to the protrusion 63*a* through a hole therein. The upstream sensor case support arm 62 includes a support arm protrusion 62*a*, which is pulled up in the +Z direction by the arm drive lever B 64, thereby retracting the upstream position detection sensor 12 to the retracted position inside the printing apparatus 1.

As the line break handle 5 is moved by the operator's operation and a line break operation starts, the cam on the line break mechanism drive gear train 51 acts so as to press the arm drive lever A 63 such that the state of FIG. 7B is reached from the state of FIG. 7A. Specifically, the protrusion 63*a* of the arm drive lever A 63 moves in the −Z direction, so that the arm drive lever B 64 moves in the −Z direction as well. This releases the support arm protrusion 62*a* from a constrained state, so that the upstream sensor case support arm 62 rotates about the support arm shaft 61 in the clockwise direction in FIGS. 7A to 7C. Thus, the upstream position detection sensor 12 also contacts the print medium P, as illustrated in FIG. 7B. The protrusion 63*a* of the arm drive lever A 63 and the hole of the arm drive lever B 64 are fitted to each other with a large backlash therebetween. Accordingly, in the state where the arm drive lever A 63 is lowered, the upstream position detection sensor 12 is freely movable in the up-down direction within a predetermined range. The movement in this state is similar to that of the downstream position detection sensor 11 described with reference to FIGS. 6A and 6B. FIG. 7C is a view of a state corresponding to FIG. 4D. The rollers 10 have been separated from the print medium P but the upstream position detection sensor 12 remains in contact with the print medium P.

The support portions of the guide rollers 10 and the support portion of the downstream position detection sensor 11 are configured to be displaceable relative to each other as described above. In this way, it is possible to provide a manually scanned handheld printing apparatus capable of suppressing deterioration in image quality.

Second Embodiment

A second embodiment of the present invention will be described below with reference to a drawing. Note that the basic configuration in the present embodiment is similar to that in the first embodiment, and the characteristic configuration will therefore be described below.

Figure 8:
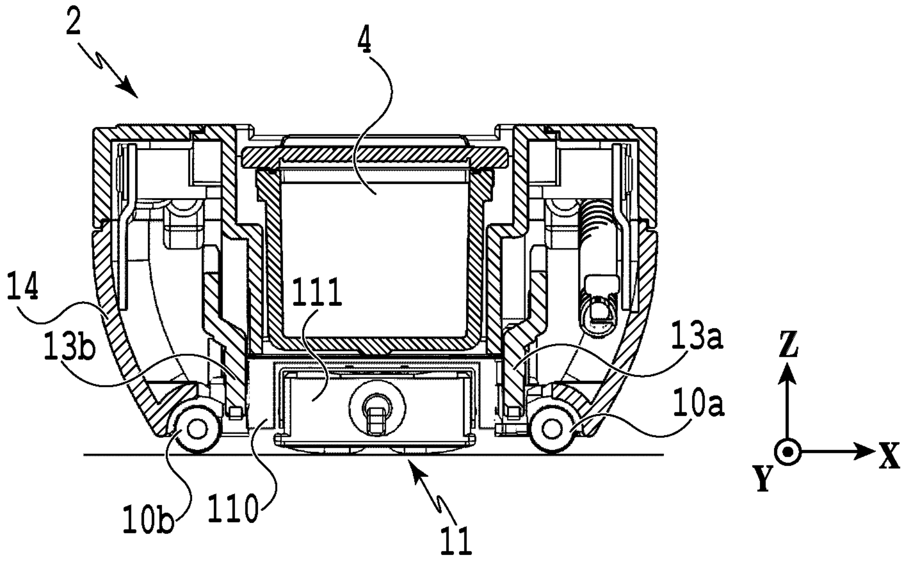
FIG. 8 is a view illustrating a downstream position detection sensor and components around it.

FIG. 8 is a view illustrating the downstream position detection sensor 11 and components around it in the present embodiment. FIG. 8 illustrates a normal standby state and a printing operation state before the printing apparatus 1 enters a line break operation. In the first embodiment, the downstream position detection sensor 11 is positioned by the lower unit case 14 and guided by the sensor case support arm 60, which makes a swinging motion. In the present embodiment, the downstream position detection sensor 11 moves up and down with a transitional motion relative to the lower unit case 14.

The printing apparatus 1 in the present embodiment includes a slide-type downstream sensor case 111 and a sensor case slide guide (slide guide) 110. The sensor case slide guide 110 guides the slide-type downstream sensor case 111 in a sliding manner. The slide-type downstream sensor case 111 is configured to be capable of sliding straight in the +Z direction in contact with the sensor case slide guide 110. The slide-type downstream sensor case 111 and the sensor case slide guide 110 are made of such materials that frictional force therebetween is small so that smooth sliding movement can be achieved. Moreover, in order to not to be affected by a gap between the slide-type downstream sensor case 111 and the sensor case slide guide 110, an elastic member not illustrated is provided, and the slide-type downstream sensor case 111 is configured to move with the elastic member in contact with one side. Moreover, the slide-type downstream sensor case 111 is configured to be pressed against the print medium P by a spring not illustrated.

Such a configuration allows for suppression of a slight displacement between the lower unit case 14 and the downstream position detection sensor case which may occur in the first embodiment as a result of a large upward or downward movement of the body of the printing apparatus 1. Employing the configuration of the present embodiment also makes it possible to correctly detect the locus of movement during line break operations.

Third Embodiment

A third embodiment of the present invention will be described below with reference to drawings. Note that the basic configuration in the present embodiment is similar to that in the first embodiment, and the characteristic configuration will therefore be described below.

Figure 9A:
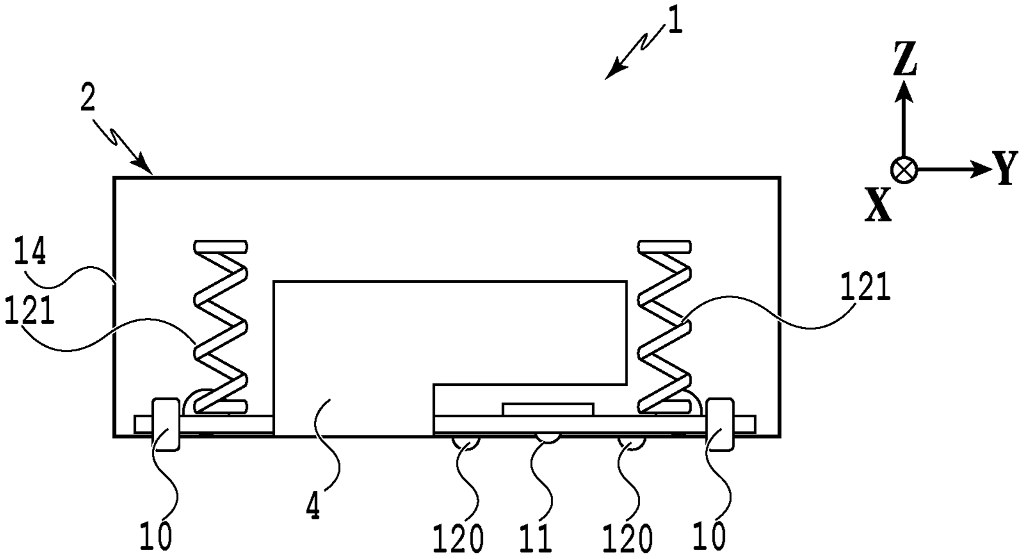
FIG. 9A is a view schematically illustrating a printing apparatus.
Figure 9B:
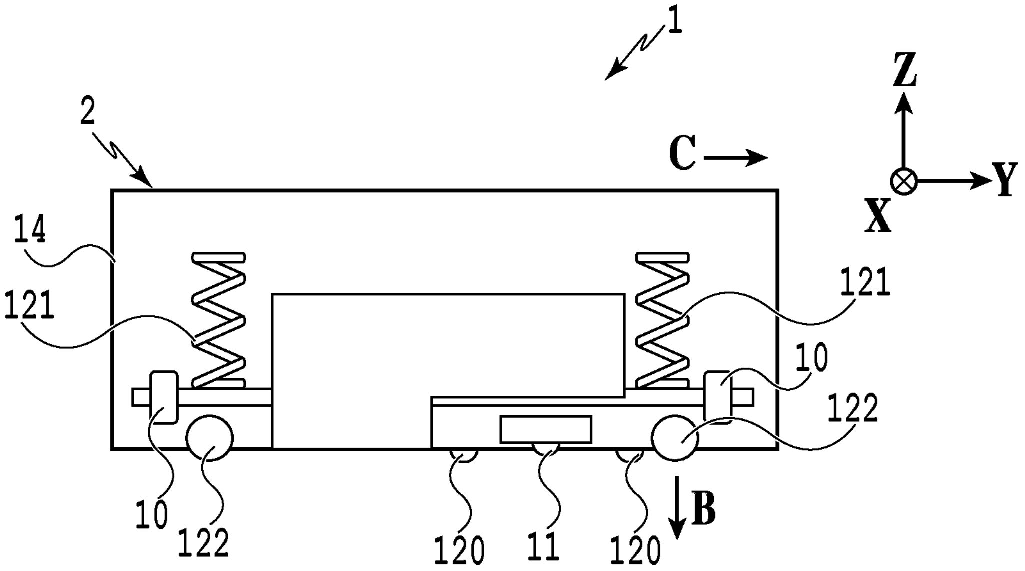
FIG. 9B is a view schematically illustrating the printing apparatus.

FIGS. 9A and 9B are views schematically illustrating the printing apparatus 1 in the present embodiment. In the first embodiment, a description has been given of a configuration in which the downstream position detection sensor 11 is contained in a sensor case independent of the lower unit case 14 and contacts the print medium P regardless of whether the lower unit case 14 is moved up or down. In the present embodiment, the guide rollers 10 are movable inside the lower unit case 14, and the downstream position detection sensor 11 is fixed to the lower unit case 14.

The printing apparatus 1 in the present embodiment includes case sliders 120, guide roller springs 121, and Y-direction guide rollers 122. The case sliders 120 are part of the lower unit case 14, and contact the print medium P during printing operations and line break operations. The guide roller springs 121 press the guide rollers 10 against the print medium P during printing operations. The Y-direction guide rollers 122 guide the printing apparatus 1 during line break operations.

FIG. 9A is a view illustrating the printing apparatus 1 during a standby period, during a printing operation, or immediately before a line break operation. Accuracy of a single component, the lower unit case 14, determines the distance between the downstream position detection sensor 11 and the print medium P in a state where the print medium P and the case sliders 120 are in contact with each other. To guide movement in the printing operation direction, the guide rollers 10 are pressed against the print medium P by the guide roller springs 121 having such an elastic force as to prevent the case sliders 120 from being separated from the print medium P. Since the cylindrical surfaces of the guide rollers 10, which exert a high frictional force, are in contact with the print medium P, the printing apparatus 1 is movable in the +X direction (printing operation direction), in which the rollers can passively roll, but is not movable in the +Y direction, in which the rollers cannot roll. Hence, the guide rollers 10 act such that the printing apparatus 1 is in a movable only in the printing operation direction.

FIG. 9B is a view illustrating the printing apparatus 1 during a line break operation. During a line break operation, the guide rollers 10 are forcibly moved in the +Z direction by a lever not illustrated, thereby being separated from the print medium P. During the line break operation, the Y-direction guide rollers 122, which have been retracted during the printing operation, are pressed against the print medium P in place of the guide rollers 10. The Y-direction guide rollers 122 are provided with a mechanism capable of rotating the rollers by such an angle as to enable a movement over a predetermined distance necessary for the line break operation. As the operator moves the printing apparatus 1 in the +Y direction, a brake is applied when the printing apparatus 1 has moved the predetermined distance, and the line break movement ends. Thereafter, as the operator returns the lever, the Y-direction guide rollers 122 return to a predetermined retracted position, so that the rotatable angle part is reset. Moreover, the guide rollers 10 return from their retracted position and are pressed against the print medium P by the guide roller springs 121.

With the configuration of the present embodiment, the printing apparatus 1 can perform a line break operation without moving in the +Z direction. As described above, it is possible to employ a configuration in which the guide rollers 10 are movable inside the printing apparatus 1 and the downstream position detection sensor is fixed inside the printing apparatus 1.

Fourth Embodiment

A fourth embodiment of the present invention will be described below with reference to a drawing. Note that the basic configuration in the present embodiment is similar to that in the first embodiment, and the characteristic configuration will therefore be described below.

Figure 10:
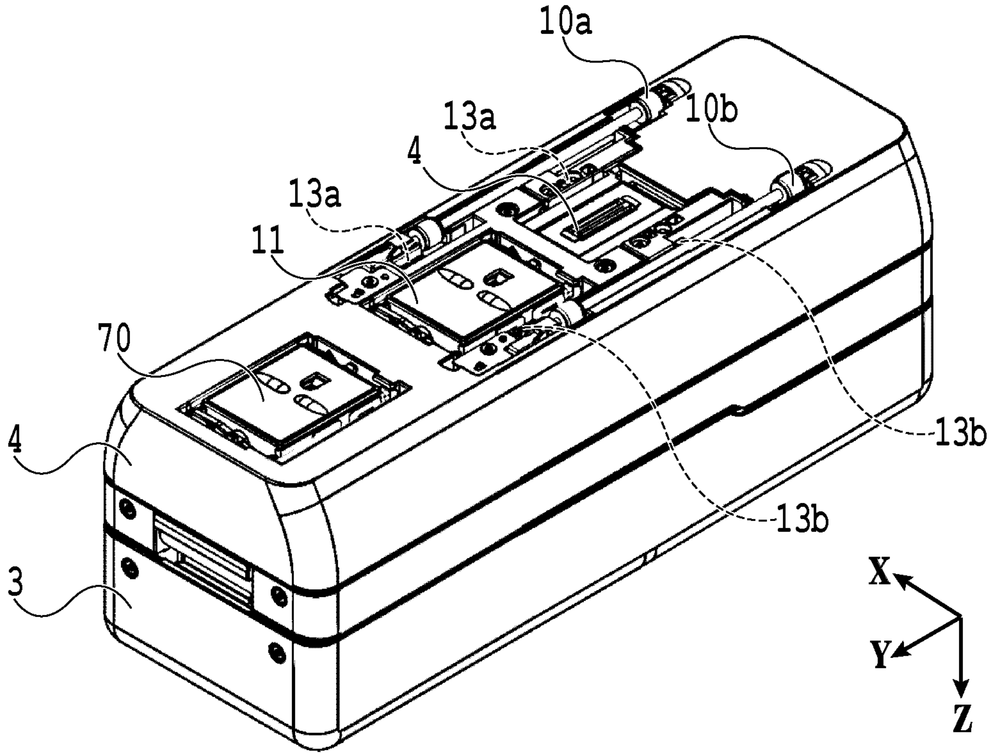
FIG. 10 is a perspective view illustrating a printing apparatus.

FIG. 10 is a perspective view illustrating the printing apparatus 1 in the present embodiment. The printing apparatus 1 in the present embodiment includes the downstream position detection sensor 11 and a second downstream position detection sensor 70 at positions downstream of the print head 4 in the line break direction (+Y direction). Moreover, during printing operations, the downstream position detection sensor 11 and the second downstream position detection sensor 70 are both in contact with the print medium P. The second downstream position detection sensor 70 is disposed on a side of the printing apparatus 1 in the line break direction. Thus, like the downstream position detection sensor 11, the second downstream position detection sensor 70 is not scanned over the printed area PA although being constantly in contact with the print medium P. The second downstream position detection sensor 70 can therefore be configured to be pressed against the print medium P with a similar support configuration to that of the downstream position detection sensor 11.

Note that a single sensor that detects the relative moving amount between the printing apparatus 1 and the print medium P may be provided downstream of the print head 4 in the line break direction (+Y direction).

With such a configuration, the moving amount of the printing apparatus 1 can be detected with a plurality of position detection sensors even during printing operations. This enables more accurate position detection.

The embodiments described above may be implemented in combination as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125314 filed Jul. 30, 2021, which is hereby incorporated by reference herein in its entirety.

What is claimed is:

1. A printing apparatus comprising:

a holding unit configured to be held by a user to move the printing apparatus;

a printing unit configured to perform printing operation for printing an image onto a print medium according to a movement of the printing apparatus;

a guide unit that guides the movement of the printing apparatus;

a detection unit that detects a relative moving amount between the printing apparatus and the print medium;

a detection unit support portion supporting the detection unit; and a guide unit support portion supporting the guide unit which is configured to be able to displace relative to the detection unit in a direction substantially orthogonal to a printing surface of the print medium to be printed during printing, wherein the detection unit includes a first detection unit and a second detection unit, and wherein the first detection unit and the second detection unit are disposed with the printing unit therebetween.

2. The printing apparatus according to claim 1, wherein the detection unit is provided to be capable of contacting the print medium.

3. The printing apparatus according to claim 1, wherein the movement of the printing apparatus includes (1) a printing operation of performing printing while being scanned in a first direction and (2) a line break operation of moving in a second direction crossing the first direction, wherein the first detection unit is in contact with the print medium during the printing operation and the line break operation, and wherein the second detection unit is not in contact with the print medium during the printing operation and is in contact with the print medium during the line break operation.

4. The printing apparatus according to claim 1, wherein the detection unit further includes a third detection unit, and wherein the first detection unit and the third detection unit are provided on one side relative to the printing unit.

5. The printing apparatus according to claim 4, wherein movements of the printing apparatus include (1) a movement for the printing operation while being scanned in a first direction and (2) a movement for a line break operation for moving in a second direction crossing the first direction, and wherein the first detection unit and the second detection unit are in contact with the print medium during the printing operation and the line break operation.

6. The printing apparatus according to claim 1, wherein the guide unit includes a plurality of guide rollers each including a pair of rollers and a shaft, and is supported by the guide unit support portion such that the shafts are substantially parallel to each other.

7. The printing apparatus according to claim 1, wherein the detection unit support portion is pivotally supported by a link having a rotation center thereof on a body of the printing apparatus.

8. The printing apparatus according to claim 1, wherein the detection unit support portion is provided via a slide guide disposed on a body of the printing apparatus so as to enable sliding movement, and is provided to be capable of moving straight along the slide guide in a direction substantially orthogonal to the printing surface.

9. The printing apparatus according to claim 1, wherein the guide unit support portion is provided to be displaceable relative to a body of the printing apparatus.

10. The printing apparatus according to claim 1, wherein the detection unit detects the relative moving amount by optically reading a characteristic of a surface of the print medium.

11. The printing apparatus according to claim 1, wherein movements of the printing apparatus include (1) a movement for the printing operation while being scanned in a first direction and (2) a movement for a line break operation for moving in a second direction crossing the first direction, and wherein the first detection unit is provided on a side in the second direction relative to the printing unit.

* * * * *